No. 878,680. PATENTED FEB. 11, 1908.
J. B. SNELL.
FASTENER FOR MIRRORS.
APPLICATION FILED AUG. 14, 1906.
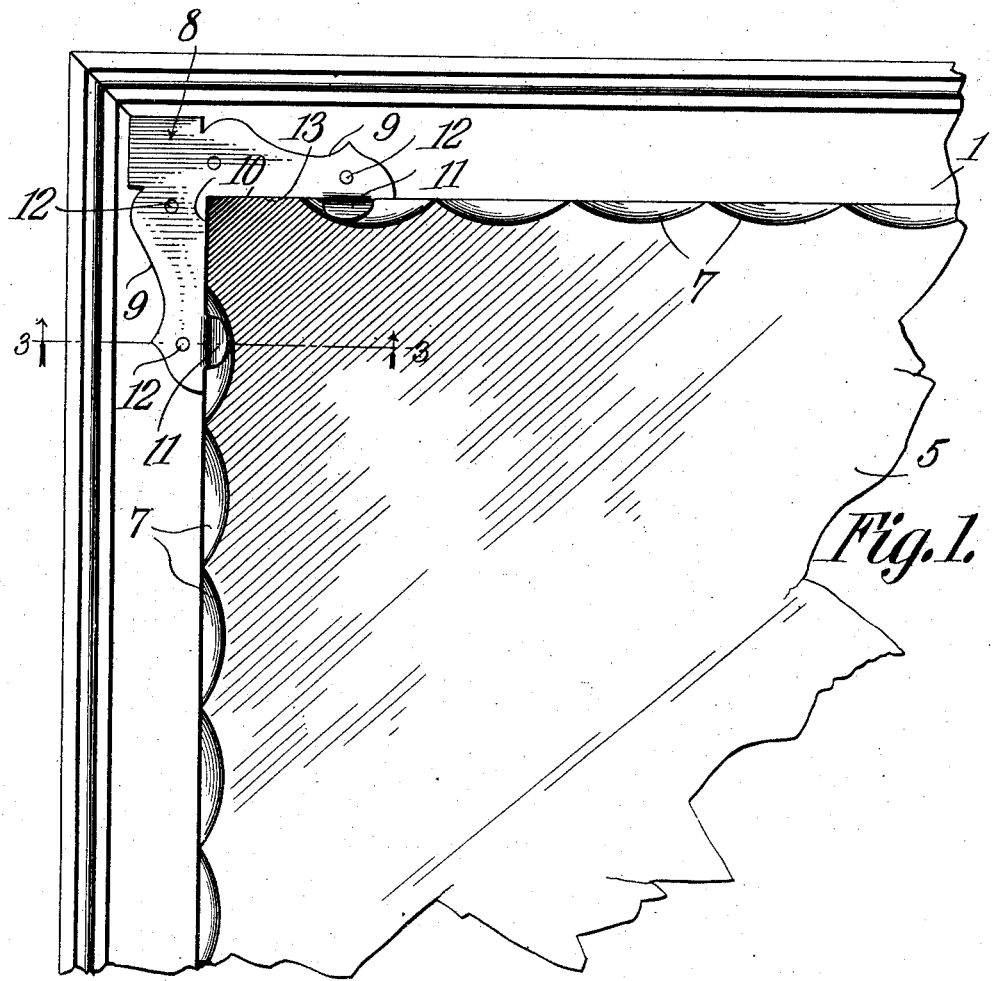
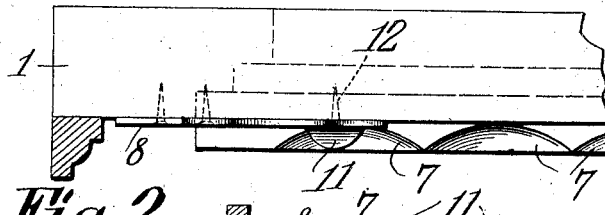
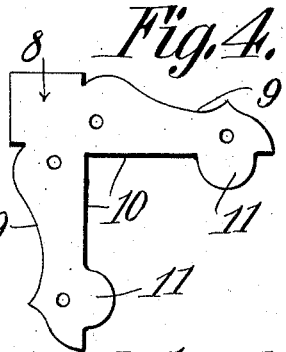
John B. Snell,
INVENTOR.
WITNESSES:
ATTORNEYS

UNITED STATES PATENT OFFICE.

JOHN BASSETT SNELL, OF BUTLER, PENNSYLVANIA.

FASTENER FOR MIRRORS.

No. 878,680.　　　Specification of Letters Patent.　　　Patented Feb. 11, 1908.

Application filed August 14, 1906. Serial No. 330,606.

*To all whom it may concern:*

Be it known that I, JOHN BASSETT SNELL, a citizen of the United States, residing at Butler, in the county of Butler and State of Pennsylvania, have invented a new and useful Fastener for Mirrors, of which the following is a specification.

This invention relates generally to mirrors, and particularly to devices for fastening them in their frames.

The objects of the invention are to improve and simplify the construction of such devices; and furthermore, to decrease the expense attending their manufacture.

With the foregoing and other objects in view, which will appear as the description proceeds, the invention resides in the combination and arrangement of parts and in the details of construction hereinafter described and claimed.

In the accompanying drawings forming part of this specification: Figure 1 is a front view showing a portion of a mirror constructed in accordance with the invention; Fig. 2 is a side elevation of the mirror, with a portion of the ornamental border cut away and shown in section; Fig. 3 is a section on the line 3—3 of Fig. 1; and Fig. 4 is a detail view showing one of the clips.

Like reference numerals indicate corresponding parts in the different figures of the drawings.

The reference numeral 1 indicates a mirror frame which may be of any suitable size, shape and construction according to the form of mirror which it is desired to produce. The frame 1 is formed internally with a lower rabbet 2 to receive the mirror backing 3 which is usually formed of wood or cardboard, and an upper rabbet 4 to receive the mirror glass 5 the edges of which are formed with scallops 7.

For the purpose of securing the mirror glass 5 in the frame 1, a plurality of corner clips 8 are employed. Each of the clips 8 preferably is angular in shape and is formed with ornamental outer edges 9—9 and inner edges 10—10. The inner edges 10—10 of each clip preferably are straight and terminate at the outer edges of the upper rabbet 4, as shown. Formed integral with each of the inner edges 10 of the clip, adjacent the ends thereof, is a lug 11 which preferably is semi-circular in shape and is inclined upwardly so as to fit firmly against one of the scallops 7 formed in the adjacent edge of the mirror glass. Each of the lugs 11 preferably is slightly curved or scooped so as to conform to the shape of the scallop. The clips 8 preferably are secured in place by nails or equivalent devices 12.

The corner clips 8 constitute an exceedingly strong, simple, durable and inexpensive means of securing the mirror glass in the frame in such manner as to cause it to present a neat and ornamental appearance.

By causing the lugs 11 to fit into the adjacent scallops 7, it is found that the clips take a firm hold upon the mirror glass and are not liable to slip from the edges of the mirror even in the event that the frame should become slightly loose. By reason of this double grip which the two lugs 11 of each clip secure upon the corners of the mirror, it is found in practice that said clips brace and strengthen the frame 1 in a very material manner.

It is preferable to form the mirror with straight edges 13 adjacent the corners thereof so as to lie in line with the straight inner edges 10 of the clips and thus present a clean, unbroken appearance at the corners of the mirror.

It is to be understood that the clips 8, before they are applied to the mirror, are perfectly flat and that the operation of fastening the said clips firmly upon the mirror frame causes the lugs 11 to be bent outward at an incline and curved slightly to conform to the curve of the scallops of the mirror. By reason of the fact that this inclined and curved shape of the lugs is produced by the scallops of the mirror, it will be obvious to those skilled in the art that said mirror will thereby be held securely in position and will not rattle or work loose.

What is claimed as new is:

1. A mirror comprising a frame, a mirror glass fitted within the frame and projecting beyond the face thereof, said glass having recessed edges, and clips secured to the corners of the frame and having integral projections seated in recesses in adjoining edges of the mirror glass, said projections conforming to the contour of the recesses in which they are seated.

2. A mirror comprising a frame having a rabbet, a mirror glass fitted into said rabbet and having edges formed with scallops, and clips secured to the corners of the frame and formed with straight inner edges terminating at the outer edges of the rabbet in parallelism with the corners of the mirror glass, each of said clips having inclined lugs fitted into the adjacent scallops of the mirror glass and conforming to the curve thereof.

In testimony that I claim the foregoing as my own, I have hereto affixed my signature in the presence of two witnesses:

JOHN BASSETT SNELL.

Witnesses:
 HELEN C. MILLHISER,
 W. A. HARTMAN.